(12) United States Patent
Führer

(10) Patent No.: US 7,216,560 B2
(45) Date of Patent: May 15, 2007

(54) GEARSHIFT DEVICE

(75) Inventor: Gerhard Führer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 155 days.

(21) Appl. No.: 10/519,862

(22) PCT Filed: Jun. 28, 2003

(86) PCT No.: PCT/EP03/06882

§ 371 (c)(1),
(2), (4) Date: Dec. 29, 2004

(87) PCT Pub. No.: WO2004/005769

PCT Pub. Date: Jan. 15, 2004

(65) Prior Publication Data

US 2005/0241422 A1  Nov. 3, 2005

(30) Foreign Application Priority Data

Jul. 5, 2002  (DE) .............................. 102 30 184

(51) Int. Cl.
*F16H 59/00* (2006.01)
*F16H 61/00* (2006.01)
*F16H 63/00* (2006.01)

(52) U.S. Cl. .................. 74/337.5; 74/325; 74/335; 74/339; 192/53.2; 192/84.6

(58) Field of Classification Search ............... 74/325, 74/335, 337.5, 339, 336 R; 192/53.2, 69.9, 192/84.6
See application file for complete search history.

(56) References Cited

U.S. PATENT DOCUMENTS

| 3,677,104 | A | * | 7/1972 | Hirozawa et al. ......... 74/336 R |
| 4,228,694 | A | | 10/1980 | Adam |
| 4,498,350 | A | | 2/1985 | Ross |
| 4,601,369 | A | * | 7/1986 | Hattori et al. ............. 192/3.58 |
| 4,618,046 | A | * | 10/1986 | Sassen .................... 192/69.62 |
| 4,951,792 | A | * | 8/1990 | Egawa ..................... 192/69.9 |
| 5,832,777 | A | | 11/1998 | Weilant |
| 6,065,363 | A | * | 5/2000 | Schaller et al. .......... 74/473.12 |
| 6,481,304 | B1 | * | 11/2002 | Yoshioka et al. ............. 74/335 |
| 6,698,312 | B1 | * | 3/2004 | Ore ......................... 74/606 R |

FOREIGN PATENT DOCUMENTS

| DE | 28 06 904 A | 8/1979 |
| DE | 28 06 904 C2 | 5/1982 |
| DE | 199 54 545 C1 | 3/2001 |
| JP | 84066 | 6/1988 |
| JP | 127860 | 12/1991 |
| JP | 11063216 A | 3/1999 |

* cited by examiner

*Primary Examiner*—David D. Le

(57) ABSTRACT

A gear shifting system for idler wheels (3) comprising sliding sleeves (2), which are connected torsion-resistant with a main shaft (1) and can be connected form-locking with an idler wheel (3) to be shifted via axial displacement. Actuation of the respective sliding sleeve (2) is provided through at least one adjusting unit (4), which selects an actuator such that a shifting actuation of the respective sliding sleeve (2) is possible.

7 Claims, 3 Drawing Sheets

GEARSHIFT DEVICE

This application is a national stage completion of PCT/EP2003/006882 filed Jun. 28, 2003 which claims priority from German Application Ser. No. 102 30 184.0 filed Jul. 5, 2002.

FIELD OF THE INVENTION

The present invention relates to a gear shifting system for idler wheels

BACKGROUND OF THE INVENTION

Gear shifting systems, where shifting occurs by means of axial displacement of sliding sleeves, are known from the state of the art. This way, the sliding sleeve concerned can connect an idler wheel to be shifted form-locking with a main shaft. Displacement of the sliding sleeve is accomplished in the familiar gear shifting systems through shifting elements, such as drivers, shift rails and shift forks. In order to accommodate these necessary components in the transmission, additional operations are required on the gearbox housing, which are disadvantageous.

Among other things, a shifting mechanism in which a threaded spindle is driven by an electric motor is known from the U.S. Pat. No. 4,498,350 publication. An axially displaceable element is provided on the threaded spindle, which is connected via spring elements to a frame, which is likewise axially displaceable by rotating the threaded spindle. An actuating element is, in turn, provided on the frame, which can selectively engage a first or a second gear wheel with the actuating element through the axial displacement of the frame.

This familiar shifting mechanism has a very complicated configuration in terms of its constructional layout. Furthermore, a large number of elements is absolutely required for actuating the one or the other gear wheel.

The present invention is based on the objective of proposing a gear shifting system in accordance with the kind described above, which has the lowest possible number of components and nevertheless enables simple and secure actuation of the gear shifting system.

SUMMARY OF THE INVENTION

Accordingly, a gear shifting system in accordance with the invention is proposed in which the shifting actuation or the adjustment of the respective sliding sleeves is provided by means of at least one adjusting unit, which actuates an actuator such that a desired shifting pattern is executed. One adjusting unit or several adjusting units, which are assigned to a sliding sleeve, form a so-called shifting set.

This way, the gear shifting system of the invention enables a shifting actuation of the respective shifting sleeves without the involvement of shifting elements, such as drivers, shift rails and shift forks or the like. This reduces the number of required components significantly, since the gear shifting system in accordance with the invention allows shifting to be supported without additional actuating devices. For example, parallel shifting of the sliding sleeves or gear locking, which prevents the simultaneous engagement of two gears and a desired gear selection as well as desired shifting patterns can be enabled with little effort.

Within the framework of further developing the present invention, it can be provided that electric motors or the like are used as the adjusting unit. It is also possible that adjusting units driven in a different fashion are used. As actuators, e.g., pins, slide blocks or the like, can be used, which are provided on the shaft of the adjusting unit preferably in an eccentric fashion. This way, the gear-maintaining function can occur from a circular motion of the shaft in the dead centers of the shifting path. Also gear switch-off can occur with the highest gear ratio of the circular motion from the dead centers. This way, the highest possible switch-off forces can be realized, which are an essential criterion for evaluating the gear shifting system.

In the gear shifting system of the invention, it can preferably be provided that several adjusting units are installed for one sliding sleeve, which are arranged preferably offset by about 180° about the main shaft. Other configurations are conceivable as well. For example, additional adjusting units can be used, which then are arranged evenly distributed across the circumference of the main shaft.

It is especially beneficial if the respective rotational positions of the adjusting units or the servo-motors are detected. This way, parallel adjustments of the individual sliding sleeves are also possible. Furthermore, in this way gear recognition and gear securing operations can be performed. To detect the rotational positions of the shafts of the individual adjusting units, a central detection device, for example, or also several detection devices, which are provided in the individual adjusting units, respectively, can be used.

In accordance with a beneficial further development, for example, a central control unit can be provided. The central control unit can realize vehicle-coordinated shifting in the gear shifting system in accordance with the invention. A computer or the like is preferably used as the central control unit. It is possible that the central control unit also includes the detecting unit.

BRIEF DESCRIPTION OF THE DRAWINGS

The invention will now be described, by way of example, with reference to the accompanying drawings in which.

DETAILED DESCRIPTION OF THE INVENTION

Figure 1:
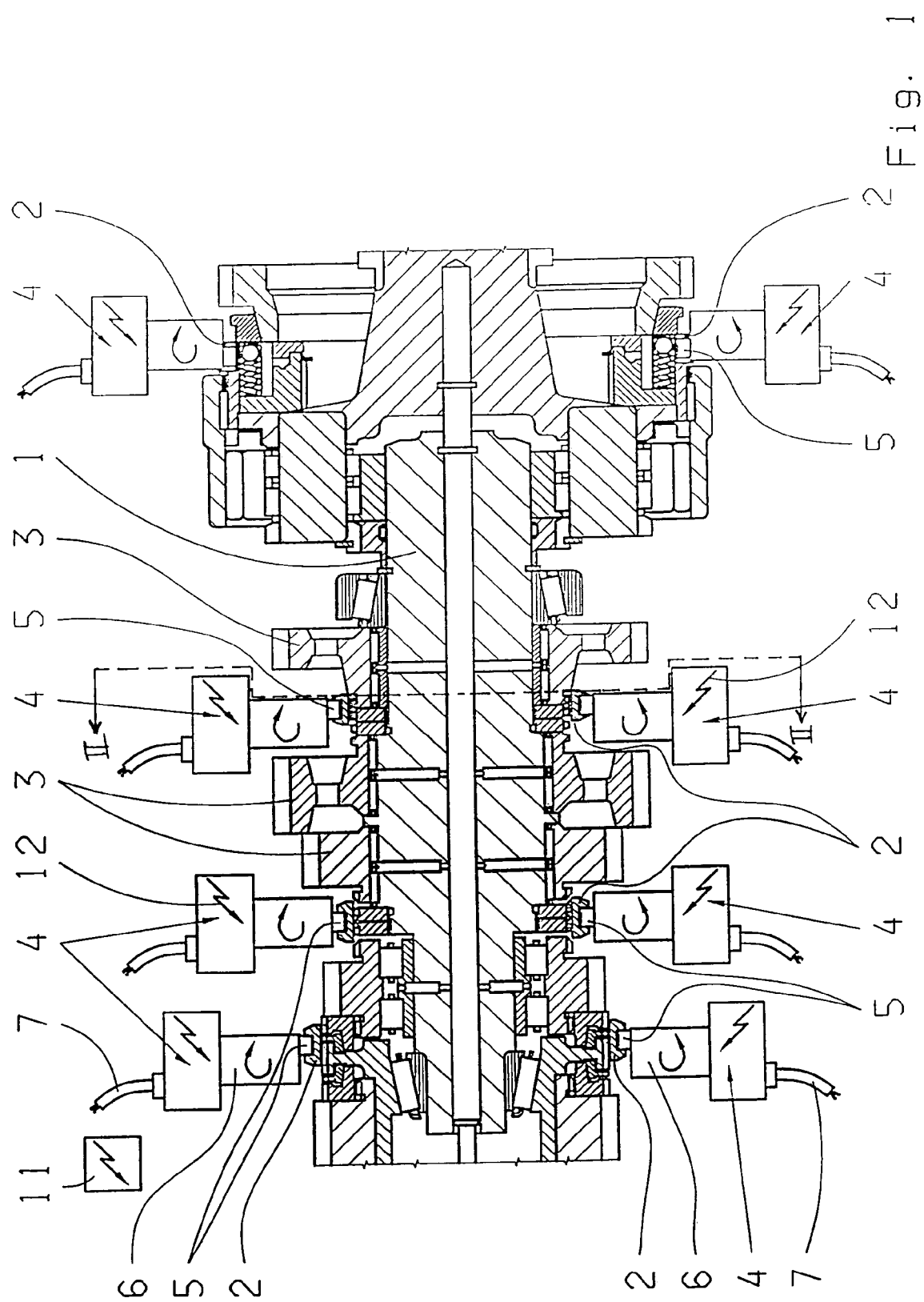
FIG. 1 depicts a sectional view of a gear shifting system in accordance with the invention.

FIG. 1 shows a possible configuration of a gear shifting system in accordance with the invention, wherein only those components that are essential for the invention are described. With respect to the reference numbers, the same reference number was used for several components of identical configuration.

A main shaft 1 of the gear shifting system comprises several axially displaceable sliding sleeves 2, which are seated on the main shaft 1 in a torsion-resistant fashion. By means of axial displacement of the respective sliding sleeves 2, an idler wheels 3, that is supposed to be shifted, can be brought into a form lock with the sliding sleeves 2, wherein the idler wheels 3 are seated rotatably on the main shaft 1 and are engaged with at least one additional torque-transmitting element.

In accordance with the invention, it is provided that the respective sliding sleeves 2 is actuated by at least one adjusting unit 4. Each adjusting unit 4 controls an actuator such that a shifting actuation of the respective sliding sleeves 2 is enabled.

Figure 3:
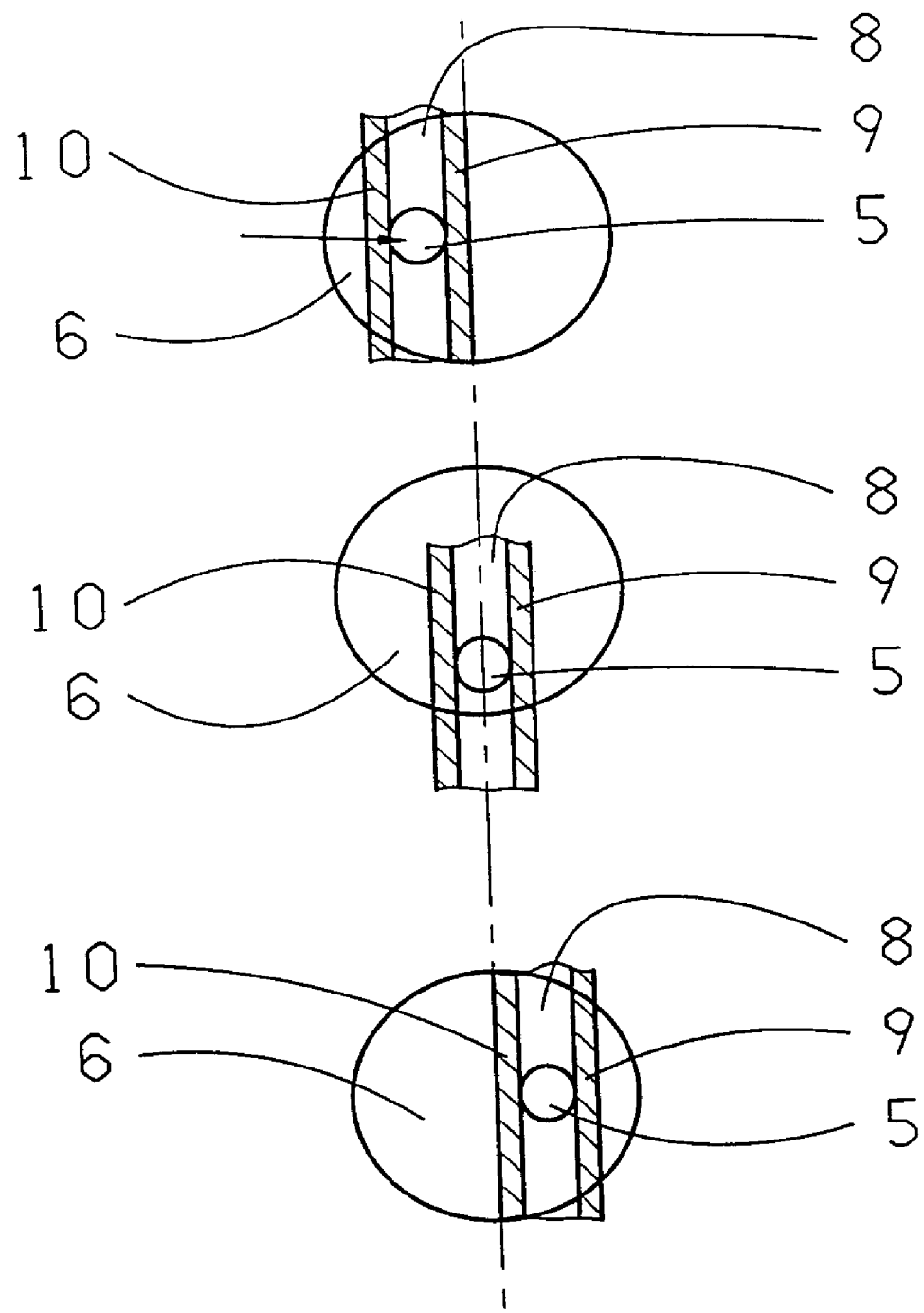
FIG. 3 depicts several enlarged basic representations of a respective actuator of an adjusting unit with the second gear engaged, in neutral position and with the first gear engaged.

In the configuration of the gear shifting system proposed here, electric servo-motors are provided as adjusting units 4 for the purpose of adjusting the sliding sleeves 2, wherein corresponding cable connections 7 are provided for the power supply. A pin 5 is provided on the motor shaft 6 as the actuator in an eccentric fashion. The rotary motion of the motor shafts 6 is indicated in FIG. 1 by an arrow, respectively. The pin 5 is arranged in a recess 8 of the respective sliding sleeves 2, wherein the recess 8 is limited by two face sides 9 and 10. This is illustrated in FIG. 3. The pin 5 rests against the two face sides 9 and 10. As soon as the motor shaft 6 is rotated with the eccentric pin 5, the corresponding sliding sleeve 2 is displaced axially on the main shaft 1 so that the sliding sleeve 2 is then engaged form-locking with the respective idler wheels 3, which is supposed to be shifted.

Figure 2:
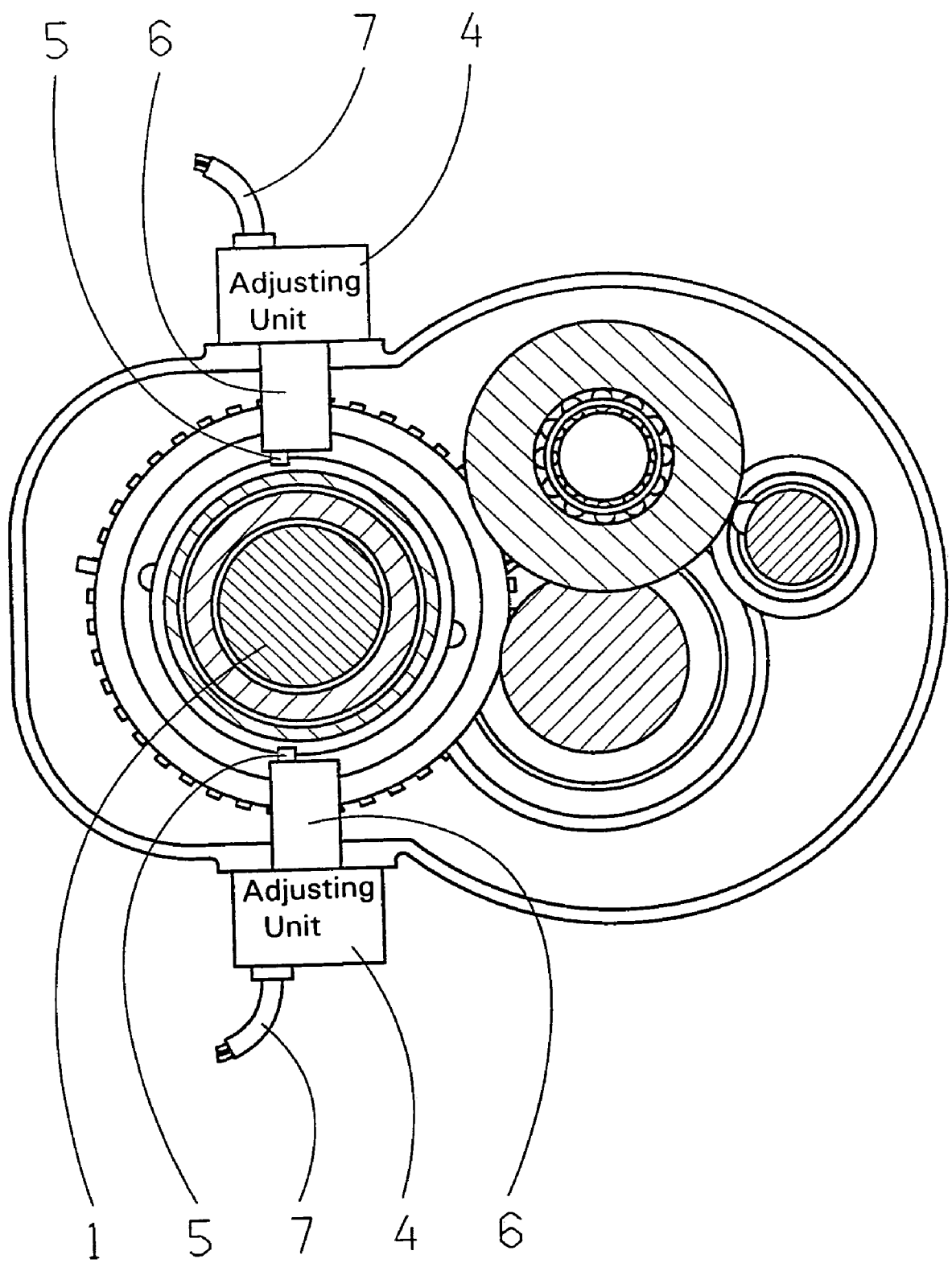
FIG. 2 depicts a cross-sectional view through a shifting set along the cutting line II—II in accordance with FIG. 1.

In a shifting set, the adjusting units 4 are respectively arranged offset across the circumference of the main shaft 1, preferably at an angle of 180°, which is evident especially from FIG. 2.

The individual servo-motors of a shifting set, as well as all servo-motors of several shifting sets, are suitably selected by a central control unit 11. In this embodiment, four shifting sets are provided, wherein each shifting set comprises two adjusting units 4 on one sliding sleeve 2, respectively.

The central control unit 11 preferably serves for vehicle-coordinated shifting and is suitably connected to the individual adjusting units 4 in terms of technical data transfer. To detect the respective rotational positions of the individual servo-motors e.g., each adjusting unit 4 can comprise a suitable detection device 12, indicated in FIG. 1 as a jagged arrow. This way a parallel adjustment of the sliding sleeves 2, gear recognition and also a gear-securing operation can be enabled.

A sectional view of a shifting set is illustrated in FIG. 2. It is apparent from this Figure, as already indicated, that the adjusting units 4 are arranged offset from the main shaft 4 at an angle of 180°.

FIG. 3 illustrates various rotational positions of a servo-motor with the pin 5 that is arranged eccentrically on the motor shaft 6. In the upper illustration, a gear, e.g., the second gear, is engaged, wherein in this state the sliding sleeve 2 cannot adjust the eccentrically arranged pin 5 because the adjusting lever arm is zero. Furthermore, the gear switch-off force is indicated by an arrow in this state.

In the center illustration of FIG. 3, a neutral position is shown, i.e., in this state no gear is engaged. In the bottom illustration, again a shifted state is indicated, wherein the first gear is engaged.

REFERENCE NUMERALS 1 main shaft
2 liding sleeves
3 idler wheel
4 adjusting unit
5 pin
6 motor shaft
7 cable connection
8 recess
9, 10 face sides
11 central unit
12 detection device

The invention claimed is:

1. A gear shifting system for idler wheels (3), comprising:
a plurality of sliding sleeves (2) torsionally fixed to a main shaft (1) and engaging with the idler wheels (3) to be shifted by axial displacement of the sliding sleeves (2), each sliding sleeve including first and second opposing circumferential faces (9,10) parallel to and spaced apart along an axis of rotation of the sliding sleeve; and
a plurality of adjusting units (4) engaging with corresponding sliding sleeves (2), each adjusting unit (4) including a servo-motor having a pin (5) mounted eccentrically on motor shaft (6) and engaging with the first and second circumferential faces (9,10) of the sliding sleeve (2) whereby eccentric rotation of the pin (5) with rotation of the motor shaft (6) causes selectable axial movement of the corresponding sliding sleeve (2) and two of the plurality of adjusting units (4) engage with each sliding sleeve (2) to facilitate movement thereof.

2. The gear shifting system according to claim 1, wherein the pin (5) reaches dead center of a shifting path of the sliding sleeve (2) during a circular motion of the motor shaft (6) and the sliding sleeve (2) maintains a form-locking connection of one of the idler wheels (3) to be shifted in the dead center.

3. The gear shifting system according to claim 1, wherein the two of the plurality of adjusting units (4) engaging each of the sliding sleeves (2), are arranged offset about the main shaft (1) at an angle of about 180° with respect to one another.

4. The gear shifting system according to claim 1, wherein a central control unit (11) is provided for a vehicle-coordinated shifting operation.

5. The gear shifting system according to claim 1, wherein at least one detection device (12) is provided for detecting rotational positions of the motor shaft (6) of each adjusting unit (4) of the plurality of adjusting units (4).

6. The gear shifting system according to claim 5, wherein the detection device (12) is integrated into each of the plurality of adjusting units (4).

7. A gear shifting system for idler wheels (3), comprising:
a plurality of sliding sleeves (2), each sliding sleeve (2) being torsionally fixed to a main shaft (1) and engaging with at least one idler wheel (3) to be shifted by means of axial displacement of the sliding sleeve (2);
each sliding sleeve including a circumferential recess (8) having first and second opposing face sides (9, 10) parallel to and spaced apart along an axis of rotation of the sliding sleeve;
a plurality of adjusting units (4), two or more of the plurality of adjusting units (4) engaging with a corresponding sliding sleeve to selectively axially displace the corresponding sliding sleeve (2) along the main shaft (1) and including a servo-motor having a motor shaft (6) rotating about an axis perpendicular to an axis of the main shaft, and each of the adjusting units (4) having a pin (5) mounted eccentrically on the motor shaft (6) to have an axial movement along the axis of the main shaft as the motor shaft (6) rotates and engaged with the recess (8) of the corresponding sliding sleeve (2) whereby eccentric rotation of the pin (5) causes selectable axial displacement of the corresponding sliding sleeve (2).

* * * * *